Jan. 5, 1954    T. A. DE CATO    2,664,683
ROLLER ATTACHMENT FOR GARDEN TRACTORS
Filed Dec. 9, 1949    2 Sheets-Sheet 1
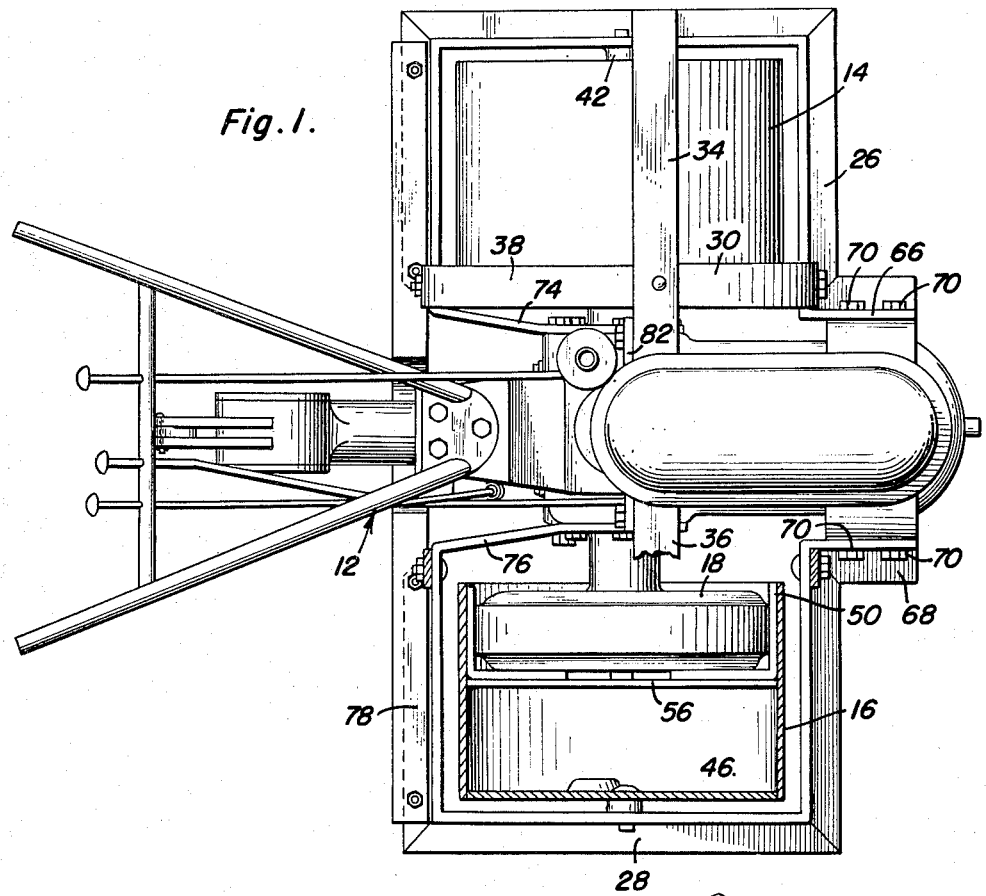
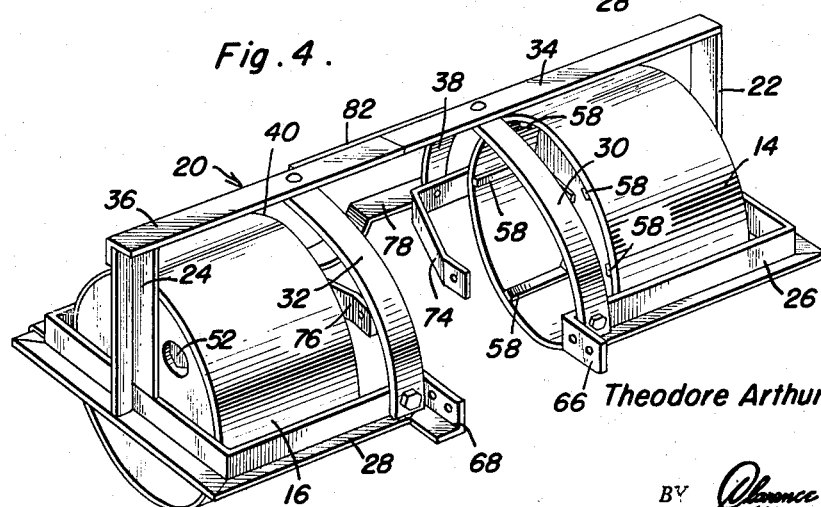
Theodore Arthur De Cato
INVENTOR.

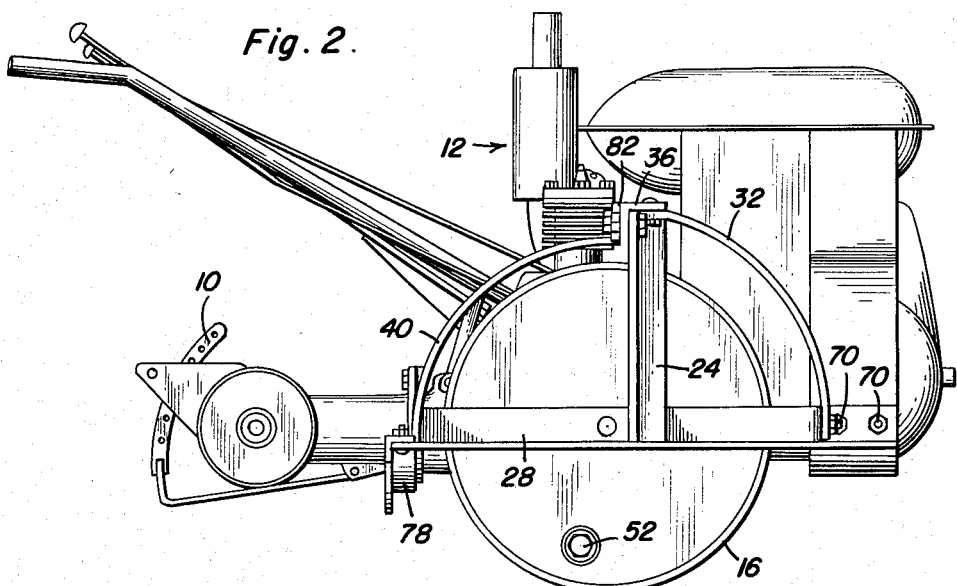
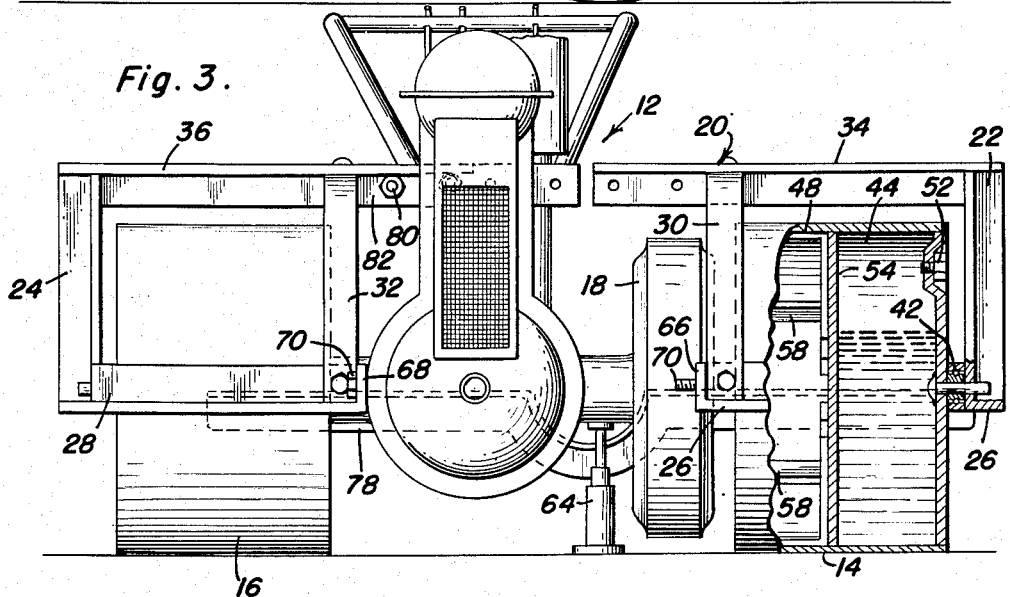

Patented Jan. 5, 1954

2,664,683

UNITED STATES PATENT OFFICE 2,664,683

ROLLER ATTACHMENT FOR GARDEN TRACTORS

Theodore Arthur De Cato, Bridgeport, Conn.

Application December 9, 1949, Serial No. 132,073

1 Claim. (Cl. 55—48)

This invention relates to novel and useful improvements in attachments for vehicles to convert the vehicle into a power-operated roller.

An object of this invention is to form a roller from a power vehicle by removably attaching a pair of frame sections to the vehicle which serve as hangers for a pair of rollers, each roller having a compartment therein to receive water and another compartment accommodating the wheels of the vehicle, together with devices for frictionally seating the wheels and for spacing the wheels from the dividing wall which forms a common wall for both compartments in each roller.

Ancillary objects and features will become apparent in following the description of the illustrated form of the invention.

In the drawings:

Figure 1 is a top view of a conventional vehicle having the attachment fixed thereto, portions of the attachment being broken away in section to illustrate internal detail;

Figure 2 is an elevational view of the device shown in Figure 1;

Figure 3 is a front view of the device in Figure 2 with portions broken away in section, and;

Figure 4 is a perspective view of the attachment.

There are many types of small vehicles now on the market which are used for sundry operations as mowing lawns, pulling attachments or implements for cutting weeds, raking and the like. It is common practice to pull a roller over a lawn either manually or by attaching an ordinary roller to the draw bar as at 10 of a conventional vehicle, for example, the one illustrated at 12.

In order to obtain satisfactory maneuverability and in order to render the vehicle more compact when used with the roller, the instant device is so fabricated that rollers 14 and 16 respectively are disposed around the wheels 18 of the small vehicle.

A frame generally indicated at 20 and consisting of frame sections is removably disposed on the chassis of the vehicle. The frame is substantially symmetrical about a center line, each section being practically identical in construction. The frame consists of a pair of vertical standards 22 and 24 which rise from sub-frames 26 and 28 each having a substantially U-shaped configuration. Smoothly curved braces 30 and 32 respectively are secured to the sub-frames 26 and 28 and also secured to the top braces 34 and 36. The top braces are secured to the standards 22 and 24, thereby forming a rigid frame construction. Smoothly curved braces 38 and 40 are secured to the sub-frames 26 and 28 and are also secured to the top braces 34 and 36. The last mentioned smoothly curved braces rise from the sub-frames on the opposite side from the braces 30 and 32.

Bearings 42 are supplied on each sub-frame in order to accommodate axles which protrude from the rollers 14 and 16.

The specific construction of each roller is seen best in Figures 1 and 3. Each roller has an outer compartment 44 and 46 respectively and an inner compartment 48 and 50 respectively. The outer compartments 44 and 46 for the two rollers are adapted to accommodate water, sand or other material in order to supply additional weight to the device. A filler plug 52 is supplied for each compartment. A dividing wall or partition 54 is supplied in the roller 14 and a similar dividing wall 56 is supplied in the roller 16. These dividing walls form the separating member for the compartments which are to hold liquid and for the compartments which are adapted to accommodate the wheels 18 of the vehicle.

In order to form a seat and a friction grip for the wheels of the vehicle, each wheel receiving compartment is provided with a number of L-shaped members 58 which have one leg flush against the cylindrical member and one leg flush against the partition 54 or 56. The portions of the L-shaped members which are flush with the dividing walls or partitions prevent the tire or wheel of the vehicle from pressing against the dividing partition of each roller and also for gripping the wheel. The other leg of each L-shaped member forms the seat.

Reference is now made to Figure 3. One frame section has been applied to the vehicle. The other frame section is being applied. It is recommended that a jack 64 be used to lift the wheel so that the entire frame section may be slid inwardly of the vehicle and from one side thereof. By slipping the frame section inwardly in this manner the wheel compartment 48 is simply slipped over the elevated wheel 18 and then the frame section is bolted in place.

In order to bolt the sections of the frame in place, the sub-frame 26 is provided with a flange 66 at the end of one leg thereof and the sub-frame 28 is provided with a similar flange 68 at the end of one leg. These flanges are provided with apertures in order to accommodate the bolts 70 which fix the front part of the sub-frames and hence the frame in place on the front part of the vehicle 12.

The rear parts of the sub-frames have inwardly projected arms 74 and 76 respectively which are provided with openings in order to accommodate bolts for fastening to a suitable part of the chassis of the vehicle 12. A cross member 78 is disposed on the rear part of both sub-frames and bolted in place in order to render the frame rigid.

After one sub-frame (Figure 3) is in place on the small vehicle, the bolts 80 are secured to the vehicle after passing through openings in the plate 82. This plate is secured to either the top brace 34 or the top brace 36. Then, the other section is slid in place on the small vehicle so that bolts similar to those indicated at 80 may be passed through openings in the other top brace and also the plate 82. These bolts 80 fix the frame to the vehicle adjacent the top part thereof and more specifically to a part of the chassis structure.

By the above described structure, the frame is held in place on the small vehicle at three different places. At the lower part and front thereof, at the lower part and rear thereof and at the upper central part thereof there are the fastening media for the frame in order to hold it in place.

Inasmuch as the illustrated type of vehicle has controls so that the wheels 18 thereof are regulated as to speed in order to guide the vehicle, the vehicle rollers act as the guide or steering device, when the attachment is applied on the small vehicle. The presence of the attachment on the vehicle in no way encumbers the vehicle either at the front, on the sides or in the rear thereof with attachments thereby making it inconvenient to operate it.

Having described the invention, what is claimed as new is:

In combination with a vehicle which has a chassis and a pair of wheels, a roller attachment comprising a frame detachably secured to said chassis and having a pair of rollers carried thereby, means disposed in said rollers frictionally gripping said wheels, said means including a number of strips, each of said rollers having a partition forming a wall for a fluid chamber, and said partitions having members superposed thereon and forming spacers for the wheels and partitions, said frame consisting of a pair of frame sections, each section forming a hanger for one of said rollers, and means releasably fastening said sections together.

THEODORE ARTHUR DE CATO.

References Cited in the file of this patent

UNITED STATES PATENTS

| Number | Name | Date |
|---|---|---|
| 1,104,502 | Hist | July 21, 1914 |
| 1,151,436 | Bamford | Aug. 24, 1915 |
| 1,279,070 | Zimmerman | Sept. 17, 1918 |
| 1,431,594 | Oswald | Oct. 10, 1922 |
| 1,447,697 | Theisen | Mar. 6, 1923 |
| 1,537,241 | Liedorff | May 12, 1925 |
| 1,752,682 | McConnell | Apr. 1, 1930 |
| 1,935,950 | Lawrence | Nov. 21, 1933 |
| 1,939,253 | Ervin | Dec. 12, 1933 |
| 2,315,397 | Butler | Mar. 30, 1943 |